United States Patent
Baer et al.

(10) Patent No.: US 7,002,754 B2
(45) Date of Patent: Feb. 21, 2006

(54) MULTILAYER POLYMER GRADIENT INDEX (GRIN) LENSES

(75) Inventors: Eric Baer, Cleveland Heights, OH (US); P. Anne Hiltner, Cleveland, OH (US); James S. Shirk, Alexandria, VA (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 10/941,986

(22) Filed: Sep. 16, 2004

(65) Prior Publication Data

US 2005/0105191 A1    May 19, 2005

Related U.S. Application Data

(60) Provisional application No. 60/519,655, filed on Nov. 14, 2003.

(51) Int. Cl.
*G02B 3/00* (2006.01)

(52) U.S. Cl. .................................. 359/653; 359/654

(58) Field of Classification Search ................ 359/652, 359/653, 654
See application file for complete search history.

(56) References Cited

U.S. PATENT DOCUMENTS

| | | | |
|---|---|---|---|
| 4,657,344 A * | 4/1987 | Bohm | 427/166 |
| 4,794,435 A | 12/1988 | Suzuki et al. | |
| 4,956,000 A | 9/1990 | Reeber et al. | |
| 5,044,737 A * | 9/1991 | Blankenbecler | 359/653 |
| 5,541,774 A | 7/1996 | Blankenbecler | |
| 5,689,374 A * | 11/1997 | Xu et al. | 359/652 |
| 5,861,934 A | 1/1999 | Blum et al. | |
| 6,606,199 B1 * | 8/2003 | Wang | 359/652 |
| 2004/0042729 A1 * | 3/2004 | Zhou et al. | 385/49 |
| 2004/0105163 A1 * | 6/2004 | Bryan et al. | 359/652 |

* cited by examiner

Primary Examiner—Scott J. Sugarman
(74) Attorney, Agent, or Firm—Stamatios Mylonakis

(57) ABSTRACT

Disclosed are axial, radial or spherical gradient index (GRIN) lenses fabricated by layering composite polymer films into an hierarchical structure.

31 Claims, 17 Drawing Sheets

FOCAL POINT

MULTILAYER POLYMER GRADIENT INDEX (GRIN) LENSES

This application claims priority from U.S. Provisional application 60/519,655, filed Nov. 14, 2003, which is incorporated herein by reference in its entirety.

BACKGROUND OF THE INVENTION

1. Field of the Invention

The present invention relates to the fabrication of axial, radial or spherical polymer gradient index (GRIN) lenses that possess either a fixed focal length or dynamically variable focal length. The lenses are supercomposite polymers formed by layering polymer composite films into hierarchical structures. They can be designed for use from the visible to the mm wavelength ranges.

2. Discussion of the Related Art

Gradient Index Optics are well known and are the subject of recent reviews. In a conventional lens, an incoming light ray is refracted when it enters the shaped lens surface because of the abrupt change of the refractive index from air to the homogeneous material. The surface shape of the lens determines the focusing and imaging properties of the lens.

In a gradient refractive index (GRIN) lens there is a continuous variation of the refractive index within the lens material. In a simple GRIN lens plane optical surfaces can be used. The light rays are continuously bent within the lens. The focusing properties are determined by the variation of refractive index within the lens material. There are two gradient index (GRIN) lens types described in the literature: axial gradient and radial/cylindrical gradient. In the axial gradient the refractive index varies in a continuous way along the optical axis of the inhomogeneous medium. In the axial gradient, the surfaces of constant index are planes perpendicular to the optical axis. In the radial/cylindrical the index profile varies continuously from the optical axis to the periphery along the transverse direction in such a way that the surfaces of constant index are concentric cylinders about the optical axis.

The simple geometry of a GRIN lens with flat surfaces allows the efficient production and simplified assembly of systems of lenses. Varying the thickness of the lens can vary the lens parameters such as the focal length and working distance. Thin lenses down to 0.02 mm in thickness are possible. Alternatively, the image plane can be made to lie directly on the exit surface of the lens.

A conventional lens with spherical surfaces and with a homogeneous index of refraction will not focus light perfectly; there will be spherical and chromatic aberrations. It is also well known in the art that these aberrations can be reduced or eliminated by employing axial gradient lens blanks. An axial gradient lens is a lens that has an index of refraction profile that varies in one direction only, usually chosen to be the optical axis. These aberration free lenses can be used advantageously in a variety of optical systems, such as slide projectors, cameras, binoculars, and many other imaging devices. The number of lens elements required for a given task can be reduced as well as the weight and complexity of the system.

U.S. Pat. No. 5,262,896, to R. Blankenbecler describes the fabrication of axial gradient lenses by the controlled diffusion process; the blanks for the fabrication of such gradient lenses can be made by a variety of processes such as SOL-GEL, infusion, and diffusion and may be glass, plastic or other suitable optical material. The above discussion applies to both radial and cylindrical lenses; however the grinding and polishing of cylindrical lenses to the needed precision is especially difficult.

U.S. Pat. No. 4,956,000, to Reeber et al describes a method and apparatus for fabricating a lens having a radially non-uniform but axially symmetrical distribution of lens material, in which the lens size and shape is determined by the selective direction and condensation of vaporized lens material onto a substrate.

U.S. Pat. No. 1,943,521, to W. Ewald describes a segmented lens built up of constituents of different indices of refraction. The separate parts of the lenses, each of which is homogeneous, are cemented together in such a manner that the boundary surfaces or interfaces are substantially located in the direction of the path of light rays. That is, the interfaces are parallel to the optical axis. The indices of refraction are chosen so as to reduce the spherical aberration of the lenses and produce clearly defined images on a screen.

U.S. Pat. No. 5,236,486, to Blankenbecler et al describes the forming of a cylindrical or spherical gradient lens blank from an axial gradient lens blank by heat molding (slumping). This process produces a monolithic lens with a continuous index of refraction profile.

A design for a cemented gradient index lens system for laser beam reshaping is disclosed by Wang et al in "*Design of gradient-index lens systems for laser beam reshaping*", Applied Optics, 32, 4763–4769 (1993). A system using two axial gradient lenses and a homogeneous central transfer lens is disclosed. The interfaces between the front gradient lens and the central transfer lens and the central transfer lens and the rear gradient lens are spherical surfaces that must be ground and polished to fit into each other. In addition, the gradient index profiles are different and must be chosen properly to function as a beam reshaper.

Real time imaging sensors are critical for military tactical applications. Over the past few years, their use increased dramatically. A wide field of view (FOV) sensor is desirable for searching tasks, but for identification and tracking, a narrower FOV is required. A variable magnification telescope or zoom lens can provide a variable FOV. With current sensor systems, a change in FOV can be achieved, for example, by the insertion or removal of lens sets from the optical path. This is slow and requires bulky mechanical or electromechanical switching. The lens, in accordance with the present invention, gives continuous variation in the FOV with time constants of milliseconds or faster in a light weight, compact, lens.

Multilayer extrusion of polymers with several to thousands of layers is known. This extrusion process gives a material comprising many thousands of alternating layers of polymers, polymer composites, and/or polymers containing inorganic or metallic nanoparticles. The polymeric materials in the alternating layers can be chosen to have substantial differences in the index of refraction ($\Delta n$) so that the resulting materials will possess a modulation in the index with a period corresponding to the layer thickness. Layer thickness down to 5 nm can be readily produced. Nazarenko et al in "*Polymer microlayer structures with anisotropic conductivity*", Journal of Materials Science, 34(7), 1461 (1999) and Mueller et al in Polymer Engineering and Science, 37(2), 355 (1997) describe the basic ideas for fabrication and the use of such materials to make dielectric reflectors. Methods of fabricating dielectric reflectors and filters with specific transmission properties and pass bands are described in P. Yeh; "*Optical Waves in Layered Media*", Wiley, New York, (1998). Properly oriented layered birefringence polymers can give multilayer mirrors that maintain reflectivity over a broad band of incident angles.

A variety of methods have been developed for producing materials with a variation in the index of refraction that is suitable for GRIN optics. Polymer GRIN lenses are often fabricated by copolymerization (Y. Ohtsuka, et al, "*Studies on the light-focusing plastic rod. 10:A light-focusing plastic fiber of methyl methacrylate-vinyl benzoate copolymer*", Applied Optics, 20, (15), 2726 (1981), and Y. Ohtsuka and Y. Koike, "*Studies on the light-focusing plastic rod. 18: Control of refractive-index distribution of plastic radial gradient-index rod by photocopolymerization*", Applied Optics, 24(24), 4316 (1985)) of two different monomers undergoing diffusion. Incomplete diffusion leads to a composition gradient and hence an index gradient across the material. Most of these techniques result in small lenses, less than 10 mm diameter. The index gradients are small; the largest index variations are typically on the order of 0.01 to 0.03. Usually the index gradients are monotonic and the variation of index with distance is limited to those that can be achieved by the laws of diffusion. The largest radial polymer GRIN lens reported was made by this technique using a curved mold. It was 7 cm in diameter and had an Δn of 0.02 (Wu, S. P, Nihei, E., Koike, Y. "*Large Radial Graded-Index Polymer*" Appl. Opt. 35(1), 28 (1996)). Other techniques to produce a composition gradient include dopant diffusion and centrifugation. Complex mixing and extrusion techniques have also been proposed. The polymer copolymerization techniques are effective only if the components are miscible over all ranges of polymerization. This usually means the components are very similar polymers and the maximum Δn that can be achieved is small. Polymeric materials made by dopant diffusion are often short lived because of migration of the dopants. The mixing/extrusion techniques involve many control variables that are difficult to control and in addition they can only be used with polymers that are miscible over a wide range of compositions.

Generally, multilayer polymers have been fabricated using glassy polymers. Elastomeric multilayer structures with layer spacings suitable for dielectric filters and reflectors have been fabricated by sequential spin coating and by multilayer extrusion.

In addition to the military applications, the lenses of the present invention will have widespread commercial applications where light weight lenses with short long and variable focal lengths are required; for example, zoom lenses for reading glasses cameras and binoculars.

In accordance with the present invention, the index gradients (Δn) can be specified independently. This allows flexibility in the focal properties of the lens that was not previously possible in a single lens. It also allows a lens to be designed with aberration corrections. A simpler improved and more flexible method to fabricate axial, radial or spherical polymer gradient lenses exhibiting the above properties is highly desirable.

SUMMARY OF THE INVENTION

The present application relates to a hierarchically multilayered polymer composite for graded index of refraction (GRIN) lenses and a method to fabricate the same. In accordance with a preferred embodiment of the present invention, a hierarchical composite structure is formed in two stages. First a set of multilayered polymer composite films are fabricated, each with a different refractive index. Second, an ordered set of these multilayered polymer composite films are assembled into a multilayered composite GRIN sheet, with the desired index gradient; further, the multilayered composite GRIN sheet is shaped into a lens.

DESCRIPTION OF THE PREFERRED EMBODIMENTS

Hierarchical Composite Structure of GRIN Lenses

Figure 1:
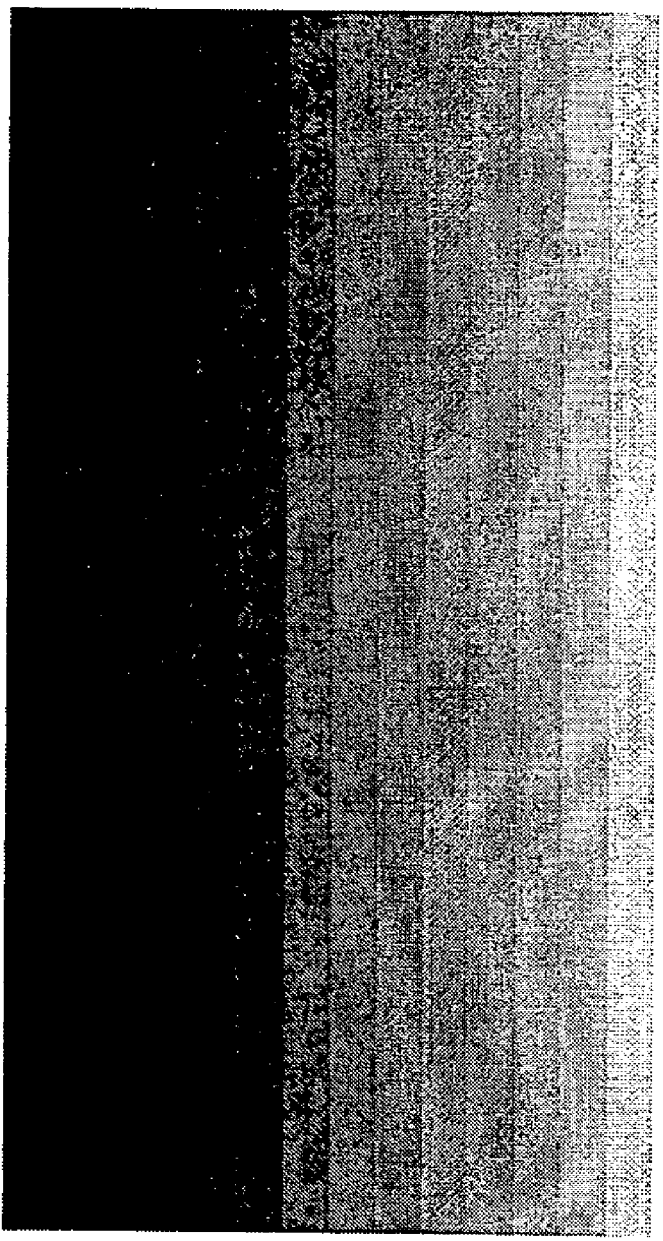
FIG. 1 is a multilayered composite GRIN sheet with an index gradient. Each of the films shown is itself a multilayered composite.

The present invention relates to a hierarchically multilayered polymer composite for gradient index of refraction (GRIN) lenses and a method to fabricate the same.

In a preferred embodiment of the present invention the hierarchical structure in a GRIN lens is fabricated in two stages. First, a set of multilayered polymer composite films is fabricated. Each polymer composite film has a different refractive index. Second, an ordered set of these multilayered polymer composite films are assembled into the hierarchical multilayered composite GRIN sheet with the desired index gradient. These multilayered composite GRIN sheets are shaped into various lenses.

In accordance with this embodiment, in the first stage the multilayered polymer composite films are fabricated. Each multilayered polymer composite film comprises up to 500,000 layers alternating between at least two types: (A) and (B). Layers of type (A) are comprised of component (a) and layers of type (B) are comprised of component (b). Components (a) and (b) are polymeric materials, preferably thermoplastic polymeric materials, such as glassy, crystalline or elastomeric materials. Components (a) and (b) can themselves be a composite polymer or a polymer blend. Preferably the layers of the multilayered polymer composite film of the present invention have a thickness in the range of from 5 nanometers (nm) to 1,000 micrometers ($\mu$m).

In order to fabricate the GRIN material, such multilayered polymer composite films are fabricated with a range of refractive indexes and an arbitrarily small index difference between them. This is done, in one embodiment of the present invention, by altering the relative thickness of the (A) and (B) layers from that in the first multilayered polymer composite film.

For the second stage in the fabrication, in accordance with this embodiment, the multilayered polymer composite films are stacked to form the hierarchical multilayered composite GRIN sheet. The adjacent multilayered polymer composite films are chosen to exhibit progressively different refractive indexes. Preferably, stacking 5 to 100,000 multilayered polymer composite films will form a multilayered composite GRIN sheet from which GRIN lenses can be fabricated as described below. The index gradient is determined by the design in which the multilayered polymer composite films are stacked to produce multilayered composite GRIN sheet. A particular advantage of this process is that any predetermined index gradient can be easily achieved using multilayered polymer composite films. The index gradient is limited only by the available range of index in the multilayered polymer composite films. The multilayered composite GRIN sheet has a hierarchical structure on the nanometer scale, micrometer scale, and the centimeter scale.

Materials

One of ordinary skill in the art will readily appreciate that a wide variety of thermoplastic polymeric materials can be used to form the lenses of the present invention. Such materials include, but are not limited to glassy polymers, crystalline polymers and elastomers, provided the layers formed from these materials are substantially transparent. Of these materials, to our knowledge, the fabrication of elastomeric multilayer structures with layer spacings less than the wavelength of visible or near infrared (NIR) light, so that the composite behaves as a dynamically variable effective medium, has never been reported. One of the requirements for materials in accordance with the present invention is a difference in refractive index between the polymeric components of the layers. The maximum index gradient that can be achieved in the lens of the multilayer polymer composite of the present invention is given by the difference between the indexes of the polymer components. The focal length, the thickness and the shape of a GRIN lens depends on the index gradient that can be achieved.

The term "polymer" or "polymeric material" as used in the present application denotes a material having a weight average molecular weight (Mw) of at least 5,000. Preferably the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Suitable polymeric materials in accordance with the present invention, include but are not limited to polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, $\alpha$-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. Also suitable are copolymers such as styrene-acrylonitrile copolymer (SAN), preferably containing between 10 and 50 wt %, preferably between 20 and 40 wt %, acrylonitrile, styrene-ethylene copolymer; and poly(ethylene-1,4-cyclohexylene-dimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers.

In addition, each individual layer may include blends of two or more of the above-described polymers or copolymers, preferably the components of the blend are substantially miscible, thus not affecting the transparency of the blend. Preferred polymeric materials include a poly(vinylidene fluoride) (PVDF) and copolymers therteof, a poly(methyl methacrylate), a poly(ethylene naphalate) (PEN), and a polycarbonate.

The components comprising the layers in accordance with the present invention can include organic or inorganic materials designed to increase or decrease the refractive index of the component, including nanoparticulate materials. Further, the components in accordance with the present invention are in the absence of a nonlinear dye.

Fabrication of Polymer GRIN Lenses

In accordance with an embodiment of the present invention the multilayered polymer composite films are fabricated first. For simplicity of discussion, the behavior of a two component system is described. In this embodiment of the present invention the multilayer polymer composite is made of two alternating layers (ABABA . . . ) of two polymeric materials referred to as component "(a)" and component "(b)", respectively, throughout the description. The components (a) and (b), exhibit different refractive indexes and form a multilayer polymer composite film represented by formula $(AB)_x$, where $x=(2)^n$, and n is the number of multiplier elements and is in the range of from 4 to 18. Components (a) and (b) can be independently a glassy polymeric material, a crystalline polymeric material, an elastomeric polymeric material or blend thereof. By way of a non-binding example, when component (a) is a glassy material, component (b) can be an elastomeric material, a glassy material, a crystalline material or a blend thereof, or when component (a) is an elastomeric material, component (b) can be an elastomeric material, a glassy material, a crystalline material or a blend thereof. However, component (a) must exhibit a different refractive index than component (b); likewise, layer (A) must exhibit a different refractive index than layer (B). A multitude of alternating layers (A) and (B) form a multilayered polymer composite film, comprised of at least 10 alternating layers (A) and (B), preferably from 50 to 500,000 alternating layers, including any increments within these ranges. The layers are preferably microlayers or nanolayers. Similarly, additional multilayered polymer composite films are formed comprised of layers ($A_i$) and ($B_i$), which layers are comprised of component ($a_i$) and ($b_i$), respectively.

In the second stage in accordance with this embodiment, a multitude of alternating multilayered polymer composite films exhibiting different refractive indexes form a multilayered composite GRIN sheet from which GRIN lenses are fabricated. Preferably the number of alternating multilayered polymer composite films is more than 5. More preferably the number of multilayered polymer composite films in a multilayered composite GRIN sheet is in the range of from 5 to 100,000, most preferably from 20 to 10,000, including any increments within these ranges. The index gradient is limited only by the available range of index in the multilayered polymer composite films. The final multilayered composite GRIN sheet has a hierarchical structure on the nanometer, the micrometer and the centimeter scale. Preferably it comprises multilayered polymer composite films of polymers with micro and nanolayered structure.

In accordance with the present invention, (a) and ($a_i$) can be the same or different thermoplastic materials. Likewise, (b) and ($b_i$) can be the same or different thermoplastic materials. Further, components (a) and (b) may be the same materials chemically, as long as they can form distinct layers exhibiting different refractive indexes, by virtue of secondary physical differences, such as conformational differences of the polymeric structure, differences resulting from different processing conditions such as orientation, or molecular weight differences.

It is feasible to develop layered structures with many components, preferably comprised of different materials. By way of a non-limiting example, a three component structure of alternating layers (ABCABCABC . . . ) of components (a), (b) and (c) is represented by $(ABC)_x$, where x is as defined above. A structure comprising any number of different component layers is included within the scope of the present invention such as (CACBCACBC . . . ).

In the embodiment described above of a two-component multilayer polymer structure, the lens is prepared by multilayered coextrusion of the two polymeric materials. Multilayer polymer composite films are comprised of alternating layers of two or more components with individual layer thickness ranging from the macroscale to the nanoscale.

The multilayered composite GRIN sheet of the present invention preferably has at least 5 films. Preferably, the multilayered composite GRIN sheet comprises from 5 to 100,000 films, more preferably from 20 to 10,000 including any number of films within these ranges. The multilayered composite GRIN sheet has an overall thickness ranging from 10 nanometers to 10 cm, preferably from 25 $\mu$m to 3 cm including any increments within these ranges. Further, a multilayered composite GRIN sheet may be formed into axial, radial or spherical lenses by slicing and shaping the multilayered composite GRIN sheets. Further, a multilayered polymer composite film in accordance with the present invention may be oriented, both uniaxially and biaxially.

Accordingly, the lenses of the present invention are formed by the layering of composite polymer films in a hierarchical structure as described above and disclosed in U.S. Pat. No. 6,582,807, issued Jun. 24, 2003, to Baer et al, which is incorporated herein by reference in its entirety. At the first level the materials are multilayered polymer composite films. The multilayered polymeric composite films in accordance with the present invention comprise alternating layers of polymers chosen to have differences in the index of refraction.

In fabricating GRIN lenses, it is desirable to be able to specify the index gradient from less than 0.01 to as large as possible. With the multilayering technique of the present invention, a wide variety of index gradients are possible. Since a larger gradient gives a wider range of GRIN lenses that can be made, it is desirable to be able to make a large gradient. This enables a shorter focal length in a thinner GRIN lens. For multilayered GRIN lenses, the index gradient can be specified from a minimum of 0.001 to a maximum of the difference in refractive index between the polymers constituting the layers. Often the largest possible range is desirable. Preferably, the lens of the multilayer polymeric structure can exhibit an index gradient of 0.01 or higher, preferably in the range of from 0.02 to 1.0, more preferably in the range of from 0.05 to 0.5, including all increments within these ranges.

An important point is that the multilayering technique in accordance with the present invention allows the use of miscible, immiscible or partially miscible polymers to achieve a large index difference. Other GRIN lens fabrication techniques use diffusion techniques to achieve an index gradient. Thus the examples in the prior art are limited to small index gradients of 0.01 to 0.03.

A second important point is that multilayered lenses can be designed to be used as optical elements over a wide wavelength range from near 40 nm to 1 meter. The specific wavelength range is determined by the polymeric components. In an embodiment of the present invention the multilayer polymer structure exhibits an internal transmission greater than 20%, preferably greater than 50%. A transparent multilayered polymer composite structure can be fabricated with a range of refractive indices by appropriate layering of the components. If the layer thickness of each layer is sufficiently thin the composite behaves as an effective medium. The refractive index can be designed to exhibit any value between the indexes of the component polymers by selecting the relative thickness of the component layers. Such a composite can be made with a transparency comparable to the component polymers.

In one embodiment of the present invention, where the elastic modulus of the component polymers differs, the refractive index of the composite can be varied mechanically via pressure, tension, compression or shear stresses or a combination of these stresses. As pointed out above, the composite can be fabricated so that one or both of the component polymers is an elastomer.

A second layering of the multilayered polymer composite films can give a multilayered composite GRIN sheet with a refractive index gradient. Note that the layering is hierarchical, first the component polymers are layered into a multilayered polymer composite film and then the multilayered polymer composite films are assembled into multilayered composite GRIN sheets. The second layering can be done so that the resulting multilayered composite GRIN sheet has an index gradient in any direction, such as the axial, radial or spherical direction. The index gradient can be continuous, discrete, or stepped. Many gradients can be achieved within the limits imposed by the index of the component polymers of multilayered polymer composite films.

If the elastic modulus of the component polymers differs, then the refractive index of one or more of the effective medium composite layers is variable, relative to the other, mechanically via pressure, tension, compression or shear stresses or a combination of these stresses. Then the index gradient in the hierarchically layered material, can also be varied via tension, compression or shear forces. The refractive index and refractive index gradient changes can also be achieved by any type of mechanical or electrical stimulus, or by magnets attached to the multilayer polymeric composite structure. The changes can be induced by electrostatic effects or by using electroactive or electrooptic component polymers. This provides the materials with a large electro-optical response.

In accordance with the present invention, the multilayered composite GRIN sheets can be shaped into any desired shape including, but not limited to axial, radial or spherical, to form lenses of various shapes, such as flat or spherical, as exemplified below.

Axial GRIN Lens

In one embodiment in accordance with the present invention, axial GRIN lenses are fabricated. To fabricate the GRIN lens, we introduce a second level of layering, by making sheets. We start with a set of these multilayer polymer composite films fabricated so that the relative values of $d_1$, and $d_2$ vary incrementally, but their sum is kept constant.

If a set of multilayered polymer composite films is stacked, the composition and index gradient varies normal to the film surface. This produces a sheet with an index gradient normal to the film plane. This is shown in FIG. 1. The multilayer polymeric structure of the present invention shown in FIG. 1 has an axial gradient. Since the index gradient depends on the arrangement and thickness of each of the different layers, it is possible to construct a specific index gradient. As an example, the multilayer polymeric structure shown in FIG. 1 was fabricated with a linear gradient, a V shaped gradient, and a parabolic gradient.

Figure 2:
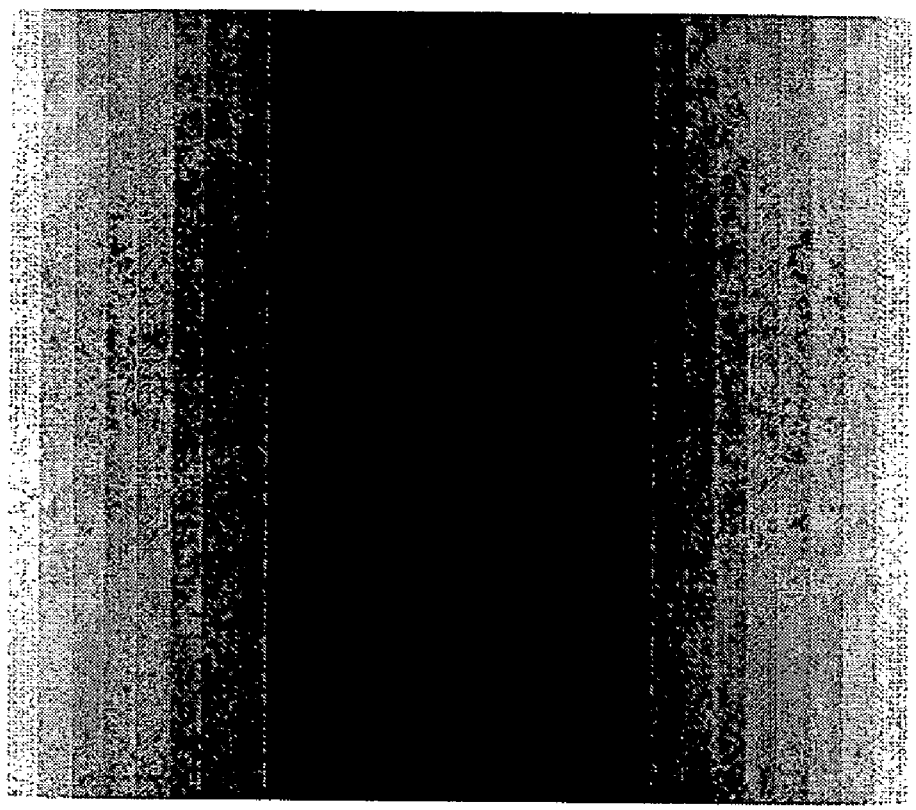
FIG. 2 is a one-directional flat lens. It is fabricated by stacking two multilayered composite GRIN sheets shown in FIG. 1, which are sliced to form axial lenses.

The multilayer polymeric structure in FIG. 1 can be used to fabricate a lens with an axial index gradient. An example is shown in FIG. 2. In FIG. 2, two multilayered composite GRIN sheets represented in FIG. 1 are combined to form a symmetrical axial stack and then sliced to form axial lenses. Axial gradient lenses are useful in optical devices for controlling aberrations. This is an efficient and cost effective method to fabricate such a lens.

Radial GRIN Lens

Figure 3:
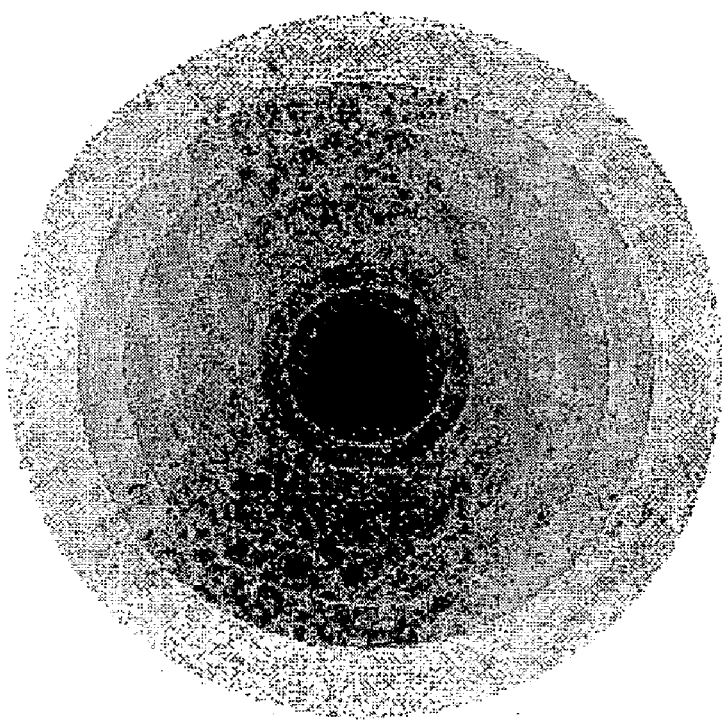
FIG. 3 is a flat lens with a radial index gradient. It is fabricated, as shown in FIG. 17, by layering a set of multilayered polymer composite films on a cylindrical rod, which is sliced into lenses of various thicknesses.

In another embodiment in accordance with the present invention, radial GRIN lenses are fabricated. The layering technique that allows the formation of the axial gradient lens can be extended to form a radial lens. Combining two sheets shown in FIG. 1, we can form the multilayered composite stack shown in FIG. 3.

As is understood by those skilled in the art, the thickness of the radial lens, and thus the focal point, can be varied. Accordingly, the term "radial" as used in the present application includes cylindrical lenses with a predetermined radial distribution.

The index of the central rod is chosen to almost match the first multilayered polymer. The stack of FIG. 3, with a variation in composition, and hence index, corresponding to the desired index variation, is wrapped concentrically around the rod. Slicing the rod into sections gives radial gradient index flat lenses.

As with the axial gradient lens, a lens with radial gradient is fabricated. The technique can be used to fabricate a wider variety of gradient designs than is possible using the diffusion or variable polymerization techniques that are currently used to fabricate GRIN lenses. It is an efficient and potentially cost effective method to fabricate GRIN lenses in large quantities.

Spherical GRIN Lens

Figure 4:
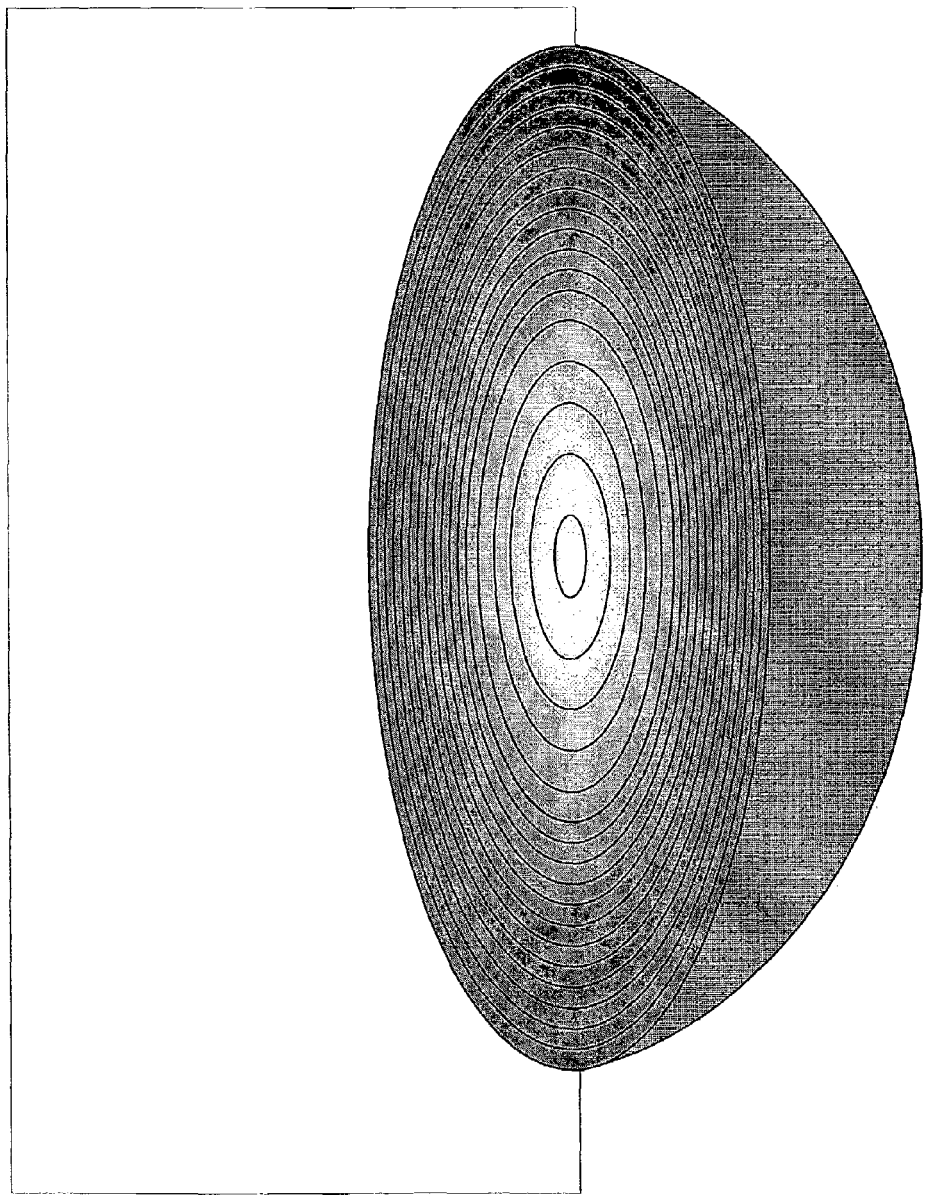
FIG. 4 is a spherical index gradient lens.

In another embodiment of the present invention a spherical GRIN lens is fabricated, comprising multilayered polymer composite structure as shown in FIG. 4. It is the shape of a normal lens with gradient, where the multilayered polymer composite films are stack in a spherical shape, like an onion, as shown in FIG. 4. The spherical lens of the present invention exhibit wider field of view, with no aberration, and have shorter or longer wavelengths than conventional lenses made with materials having no index gradient. In a spherical gradient, the index profile varies continuously along any direction from a point within the lens in such a way that the surfaces of constant index are concentric spheres, like an onion. It is further submitted that fabrication of spherical lenses cannot be achieved with the techniques previously described in the art.

Any of the above shaped lenses can be either deformable or non-deformable, and when deformable they can be either reversibly deformable or irreversible deformable. Accordingly, using multilayered polymer technology, we can also fabricate a lens where the gradient can be varied dynamically and reversibly. This is accomplished, in a preferred embodiment of the present invention, by using dynamically variable multilayer polymeric materials as the individual layers in FIGS. 1–4. The polymeric materials which make up the layers shown in FIGS. 1–4, can be fabricated so that the elastic moduli as well as the index of refraction of the alternating polymer layers are different. In these materials, applied stress, such as pressure, tension, compression or sheer stresses or a combination of these stresses, change the relative layer thickness and hence the gradient in the lens. Layering such polymers to form a hierarchical multilayer polymer structure shown in FIGS. 1–4, will give a variable axial, radial or spherical GRIN lens.

The sensitivity of the index to stress can be varied by the choice of the component polymers and their relative initial thickness. Thus it is possible to fabricate a variable gradient lens where both the initial gradient and the variability of the gradient with stress can be specified.

The Advantages of this Invention Include:

The index gradient in the lens material can be as large as 0.5 or larger. This makes possible the fabrication of lenses as thin as 25 $\mu$m (1 mil) or less with relatively short focal lengths.

In the technique in accordance with the present invention, a much larger index gradient can be achieved than in other GRIN fabrication techniques. A wider variety of component polymers can be used. The only requirement is that they are polymeric materials, preferably thermoplastic polymeric materials. This allows us to choose component polymers with a wide range of refractive indexes. The maximum index gradient that can be achieved in the lens is given by the difference between the indexes of the polymer components.

The index gradient can be defined to be continuous, discrete or stepped in any of the axial, radial or spherical direction. The index gradient does not need to be monotonic. In previous fabrication techniques for index gradient materials, the gradient was usually continuous and monotonic. The additional control over the nature of the index gradient makes possible many more GRIN lens designs with, for example, aberration corrections, bifocal and multifocal points and wider field of view.

A large variation in the refractive index gradient can be achieved. Further, a dynamic reversible variation in the refractive index gradient can be achieved. A variable index of 0.01 to 0.5 is feasible and a value approaching 1 is possible. Since the index gradient can be dynamically varied, the focal length of GRIN lenses fabricated from these materials can be varied. This makes possible the construction of variable focal length lenses and zoom lenses with no moving parts.

The lens materials are inexpensive and can be produced as large sheets of material. An important point is that the multilayering technique allows the use of immiscible, miscible, or partially miscible polymers to achieve a large index difference. Previous GRIN lens fabrication techniques used mainly diffusion techniques to achieve an index gradient. They work only for completely miscible polymers.

In distinction from the prior art methods of making a lens, in accordance with the present invention, it is possible to prepare lenses with far larger index gradients. This allows the preparation of a wider variety of lenses. It enables both thin and thick light weight lenses. Also, there is no practical limit on the lens diameter. The diameter in accordance with the present invention can be from 0.1 μm to many meters. This means that large, fast, GRIN lenses with a small f-number and a much better light gathering ability, can be fabricated.

Further, the index gradients in the structures in accordance with the present invention, can be easily defined during fabrication. This means more complex lenses with better aberration correction are possible.

Having generally described this invention, a further understanding can be obtained by reference to certain specific examples which are provided herein for purposes of illustration only and are not intended to be limiting unless otherwise specified.

EXAMPLES

A set of GRIN hierarchical multilayered composite polymer lenses was fabricated, according to staged processes discussed above, using a composite of polycarbonate (PC) and poly(methyl methacrylate) (PMMA).

Figure 5:
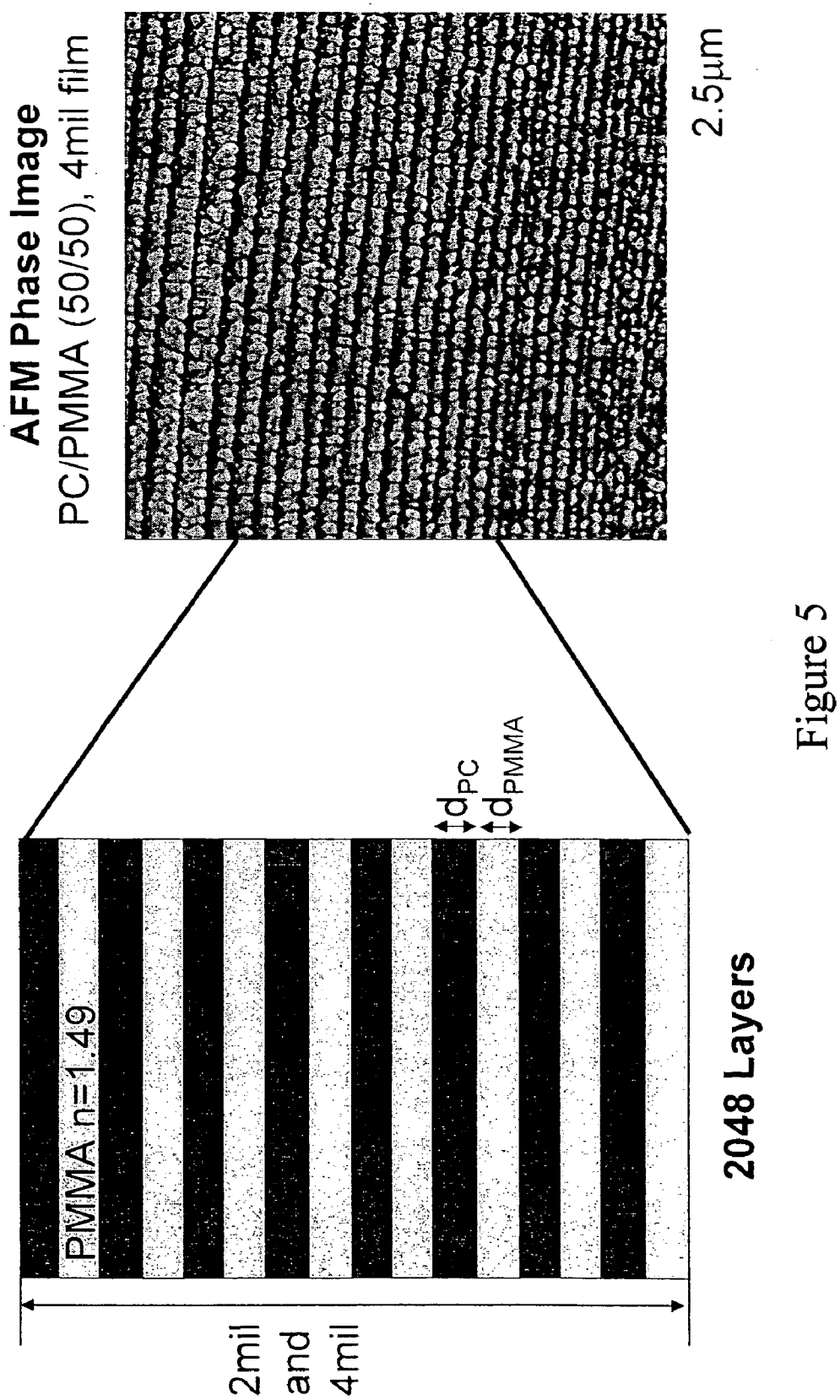
FIG. 5 shows a structure and Atomic Force Microscopy (AFM) image of a 50/50 PC/PMMA multilayer composite polymer film.

The initial multilayer polymer composite films are illustrated in FIG. 5. They are comprised of 2,048 alternating nanolayers of the component polymers, PC and PMMA with a total thickness of 50 μm (2 mils) and 100 μm (4 mils). An Atomic Force Microscope (AFM) picture of the material with equal thickness layers, labeled the 50/50 PC/PMMA sample, is also shown. The individual layer thickness for 50/50 PC/PMMA film is 25 nm in the 50 μm film and 50 nm in the 100 μm film.

Figure 6:
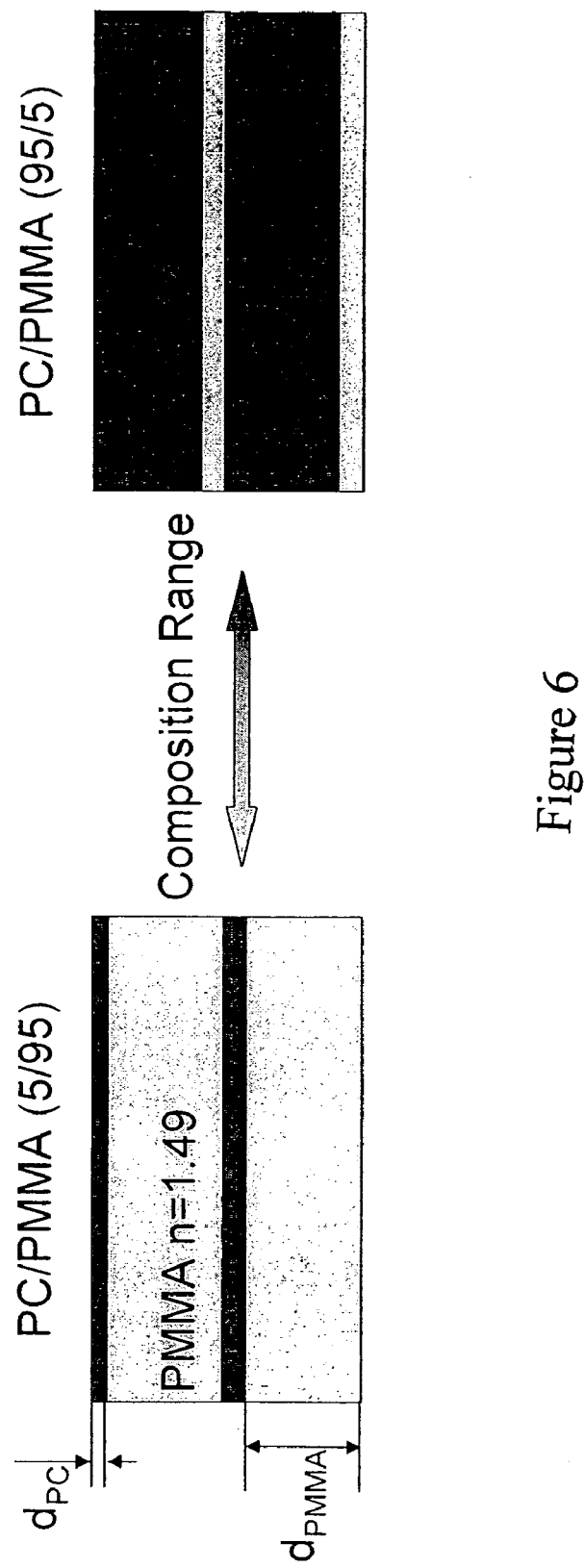
FIG. 6 shows designing the refractive index of PC/PMMA multilayer composite polymer films. The following compositions were processed for this study: 100/0, 95/5, 90/10, 85/15, 80/20, 75/25, 70/30, 65/35, 60/40, 55/45, 50/50, 45/55, 40/60, 35/65, 30/70, 25/75, 20/80, 15/85, 10/90, 5/95, 0/100.
Figure 7:
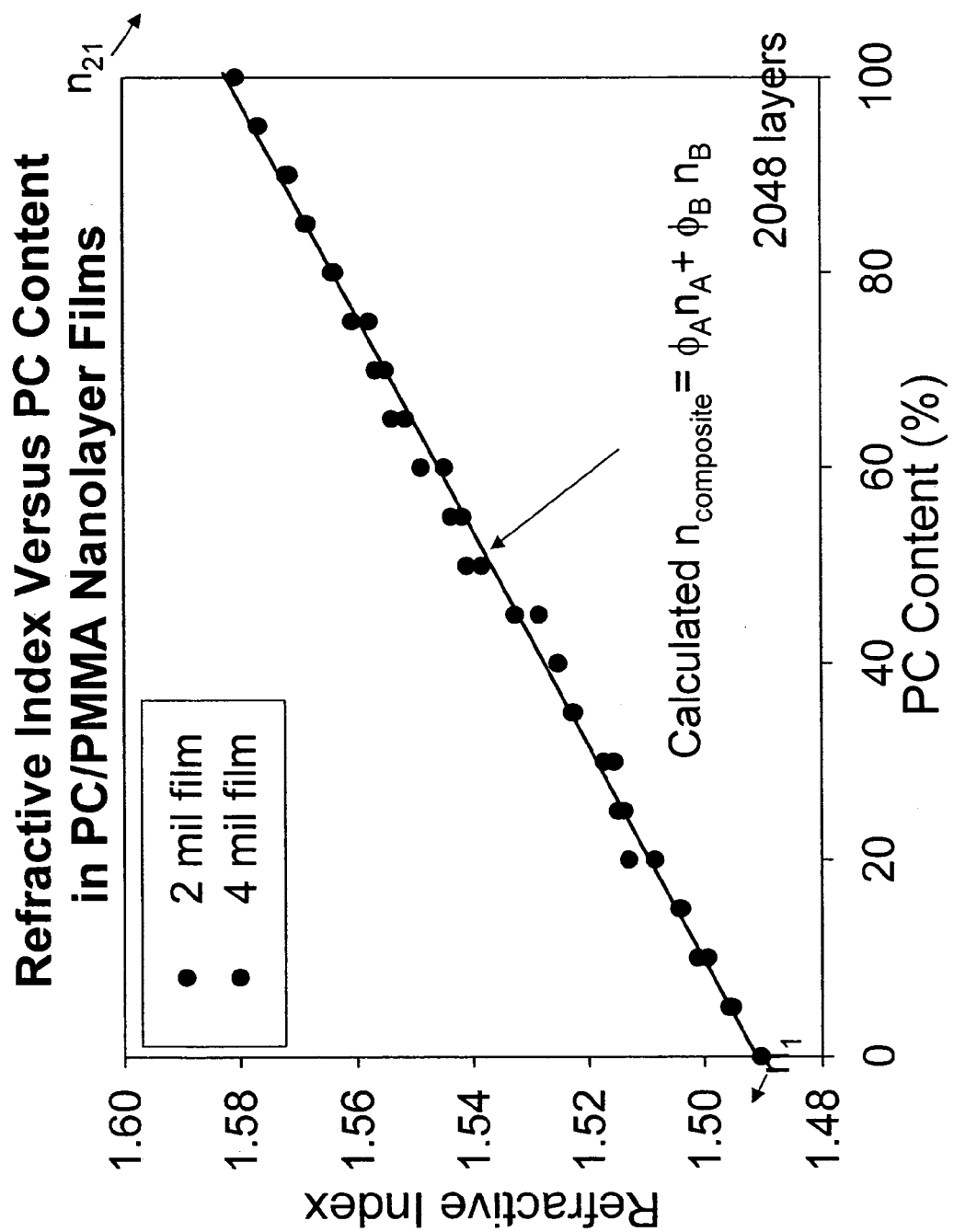
FIG. 7 shows the refractive index vs polycarbonate (PC) content in 21 multilayer composite polymer films. A set of films with a refractive index between 1.49 and 1.59 were fabricated by systematically varying the PC and PMMA content.

A set of 19 different films was fabricated with different relative layer thickness, but the same overall thickness. The ratio of the polycarbonate to the PMMA layer thickness varied from 95/5 to 5/95 to yield a set of multilayered polymer composite films with different refractive indexes. These multilayered polymer composite films are illustrated in FIG. 6. If pure films of PC and PMMA are included, this yields a set of 21 multilayer polymer composite films with refractive indexes between 1.49 and 1.59. These are obtained by systematically varying the PC and PMMA content. FIG. 7 shows the measured refractive index as a function of the fraction of the total thickness made up of polycarbonate. The refractive index of the films varies linearly with the polycarbonate content as expected.

Figure 8:
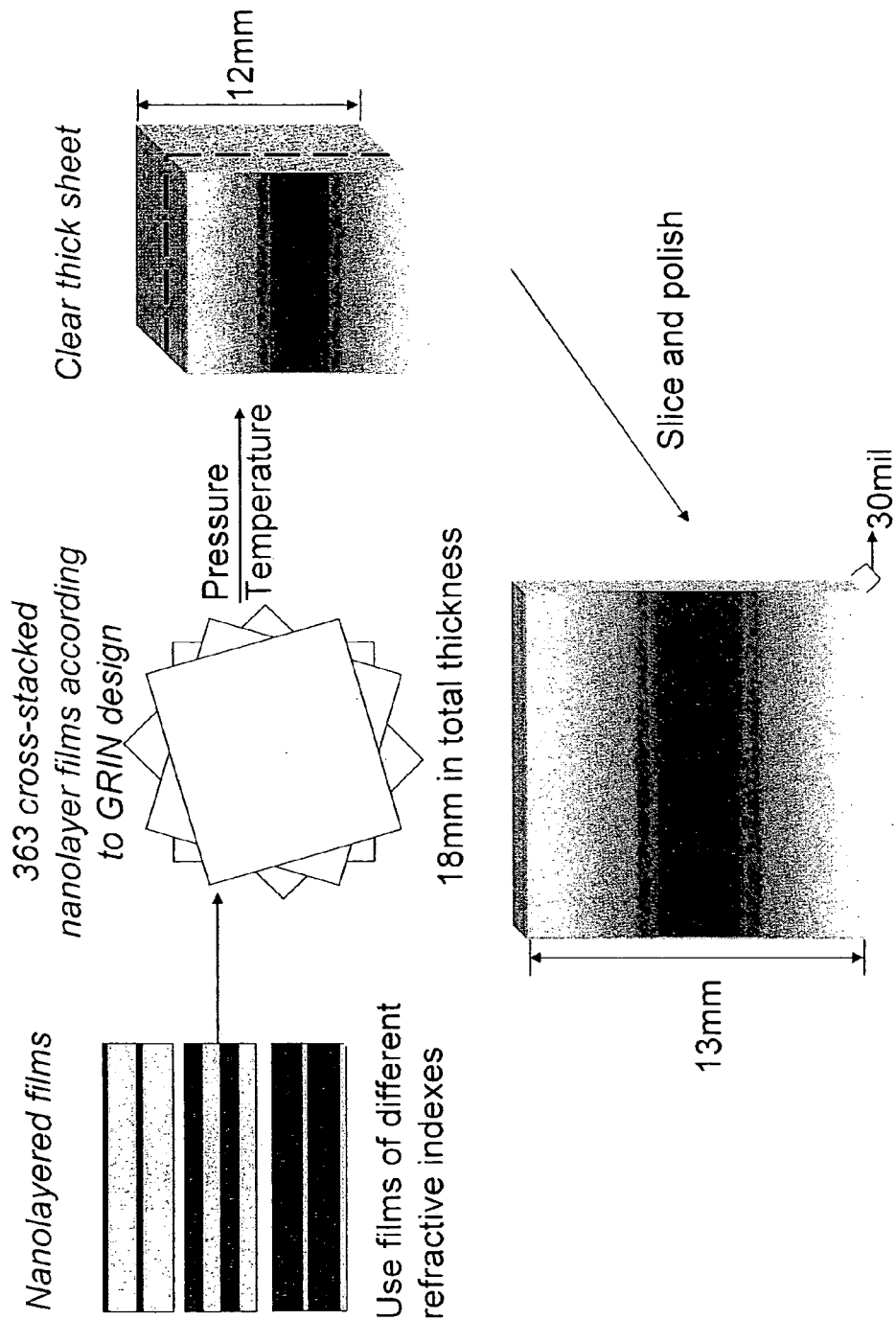
FIG. 8 shows a procedure for making a multilayered composite GRIN sheet.

The fabrication of a hierarchical multilayered composite GRIN sheet from these films is achieved by stacking the multilayered polymer composite films as is illustrated in FIG. 8. In the example shown in FIG. 8, 363 multilayered PC/PMMA films were stacked and bonded to give a sheet with an index variation across the block. The variation of the index as a function of distance, d, across this polymer preform is determined by the predefined distribution of the refractive index in the multilayered composite GRIN sheet.

The hierarchical multilayered composite GRIN lens is made by slicing this polymer block across the layers, perpendicular to the stacking direction as shown.

Figure 9:
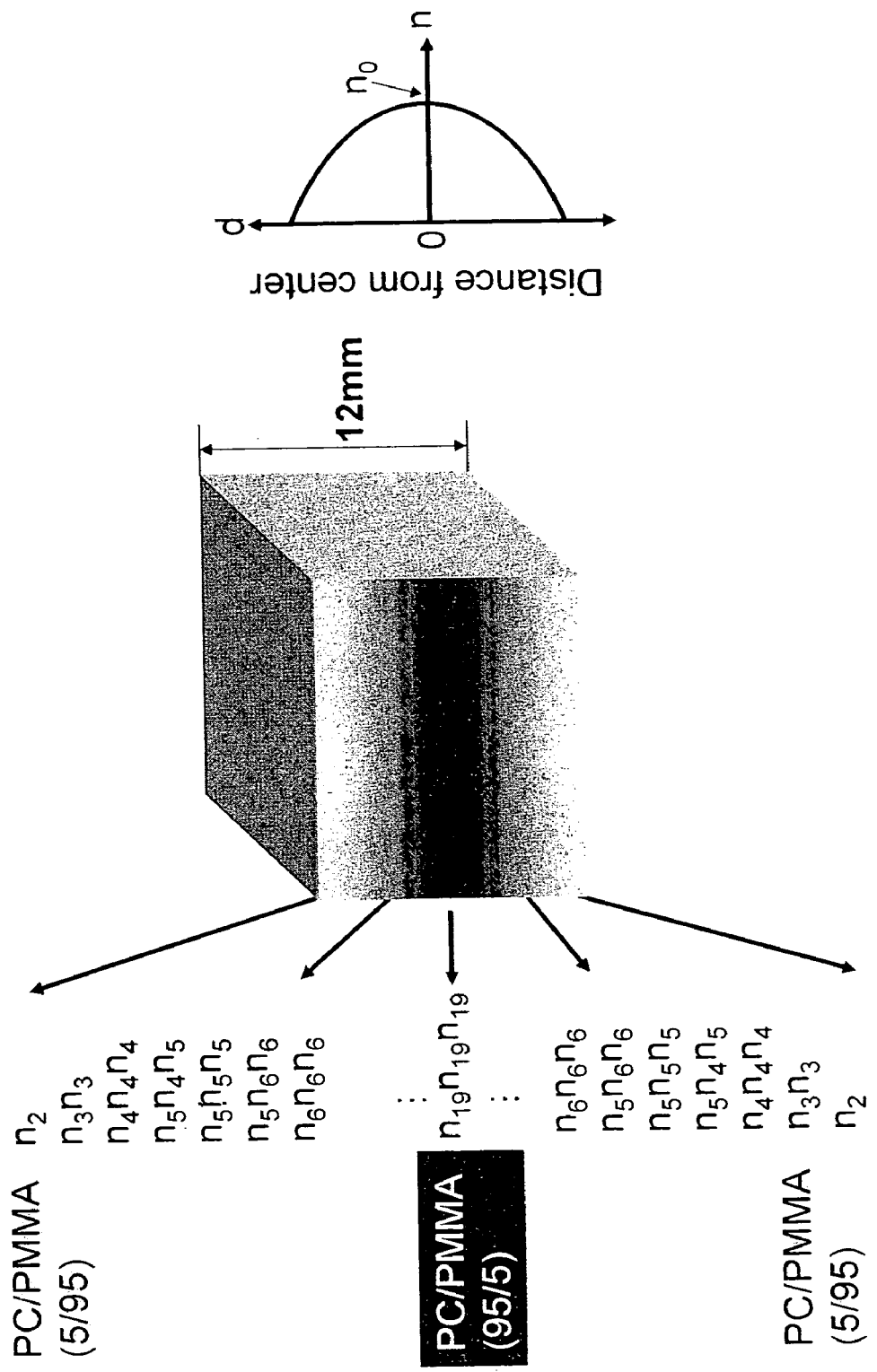
FIG. 9 shows a design of GRIN system from multilayer polymer composite films using 50 μm (2 mil) PC/PMMA multilayer polymer composite films with refractive index, $n_i$. A total of 308 individual films were stacked.
Figure 10:
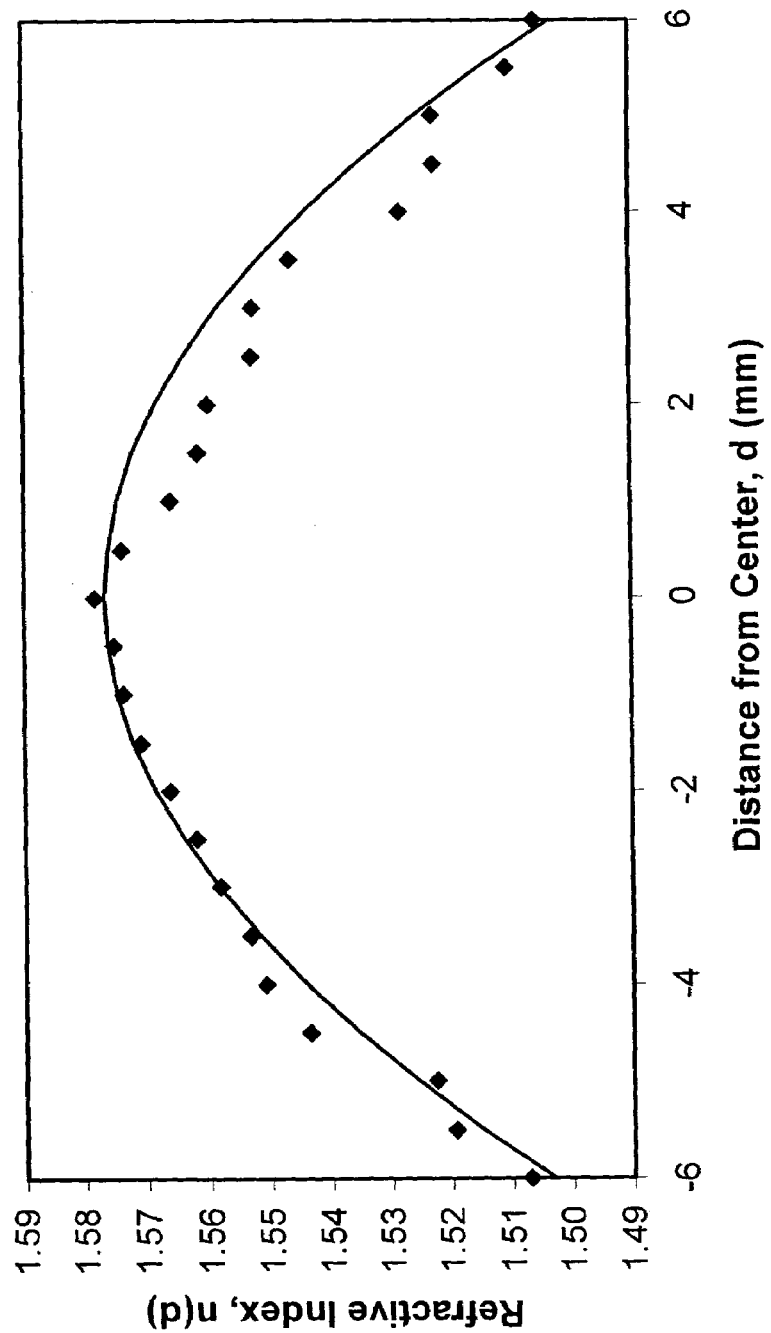
FIG. 10 denotes measured refractive index distribution of the GRIN multilayer system compared to the design distribution.

FIG. 9 illustrates the fabrication parameters of one hierarchical multilayered composite axial GRIN lens that was fabricated. This is a focusing lens. Nineteen different PC/PMMA multilayer polymer composite films were used. The refractive index of the $i^{th}$ film, $n_i$, is shown in FIG. 7. In the case shown in FIG. 9, a total of 308 multilayered polymer composite films, each 50 μm thick were stacked. This gives a total of 630,784 nanolayers in the axial focusing lens. The films were stacked as indicated to give a quadratic variation in index across the resulting polymer. The design gradient was:

$$n(d)=n_0(1-0.0013d^2)$$

where d is the distance across the polymer and $n_0=1.576$. The refractive index of the preform was measured as a function of d across the sheet. The actual index as a function of d is very close to that calculated from the above equation, as is shown in FIG. 10.

Figure 11:
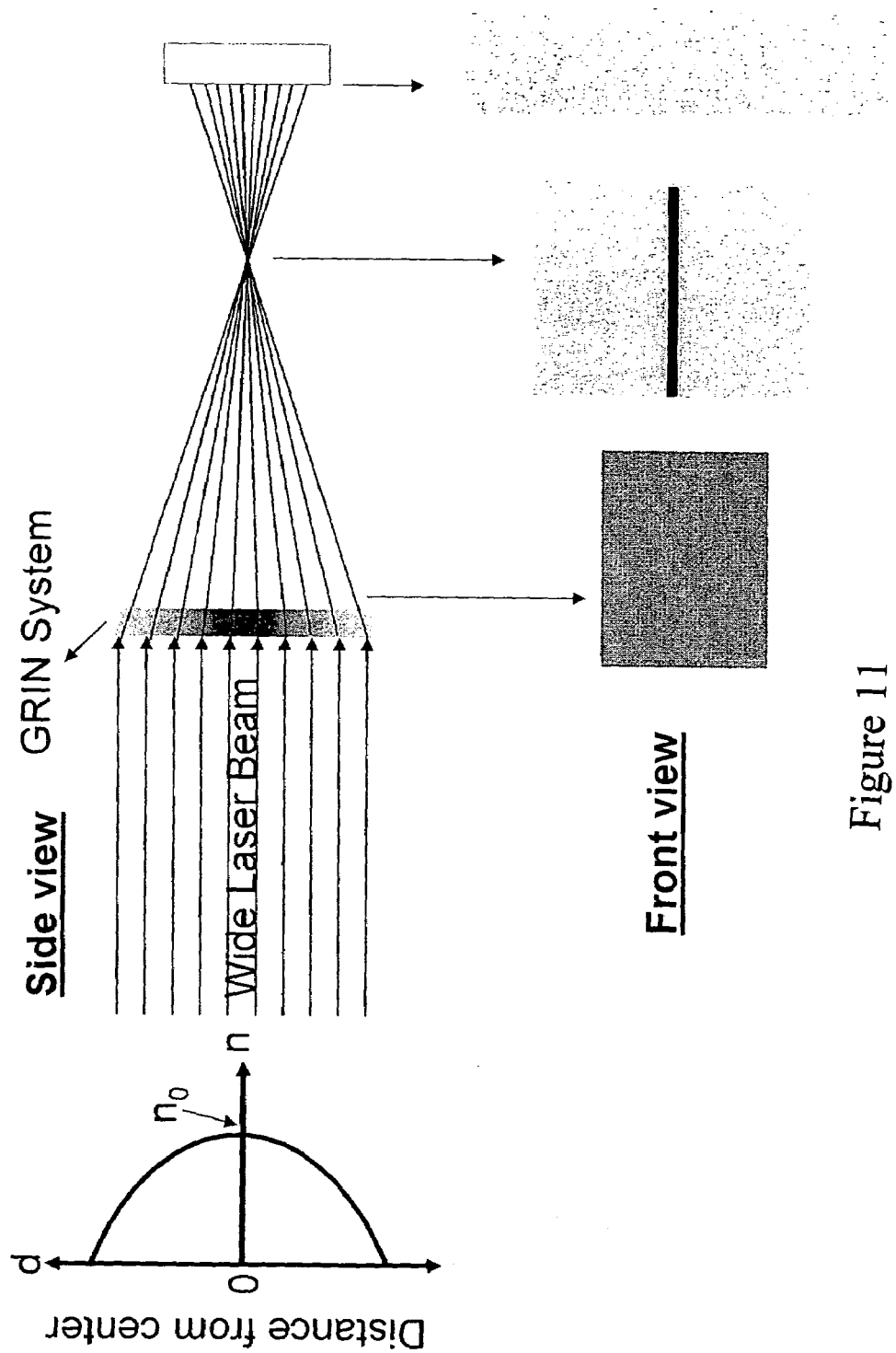
FIG. 11 shows expected focusing properties of the GRIN multilayer system shown in FIG. 9 where a circular beam is focused into a line.
Figure 12:
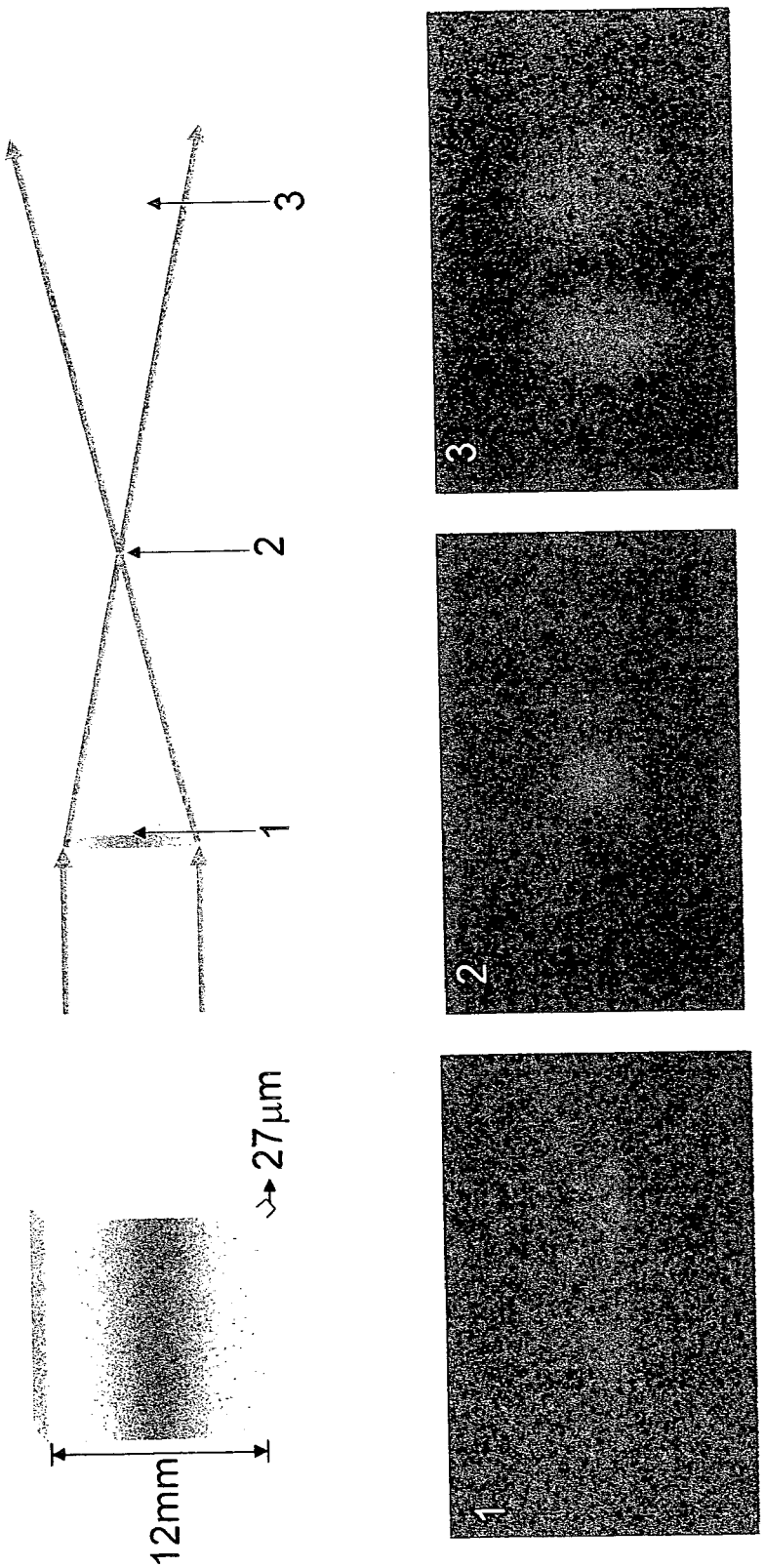
FIG. 12 shows observed focusing properties of the converging GRIN multilayer system shown in FIG. 9.

In the hierarchical multilayered composite GRIN lens described in FIGS. 8 and 9, the index gradient is in one direction. The expected focusing properties are illustrated in FIG. 11. The observed focusing properties are shown in FIG. 12.

Figure 13:
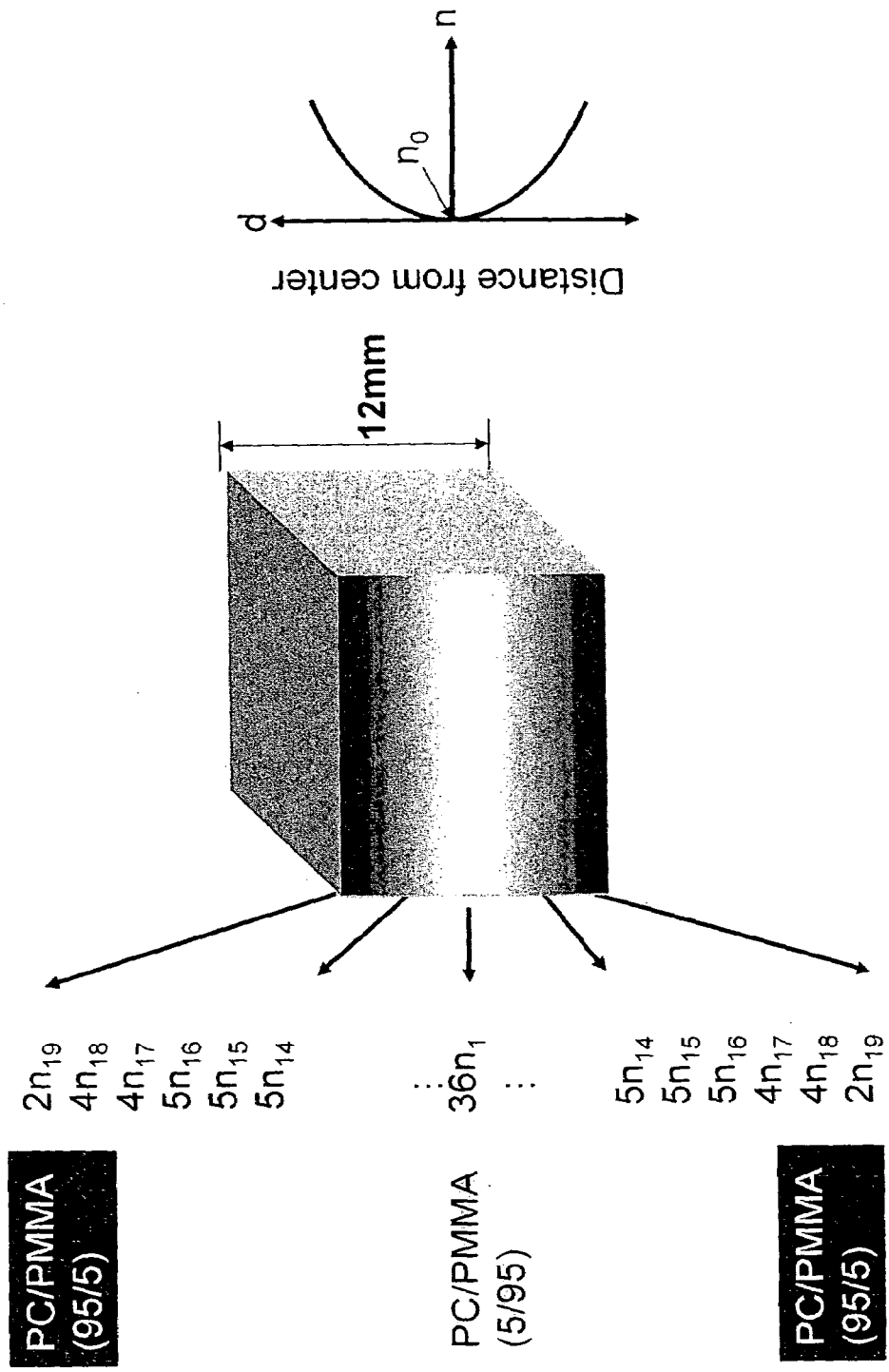
FIG. 13 shows a design of diverging GRIN system from multilayer polymer composite films.
Figure 14:
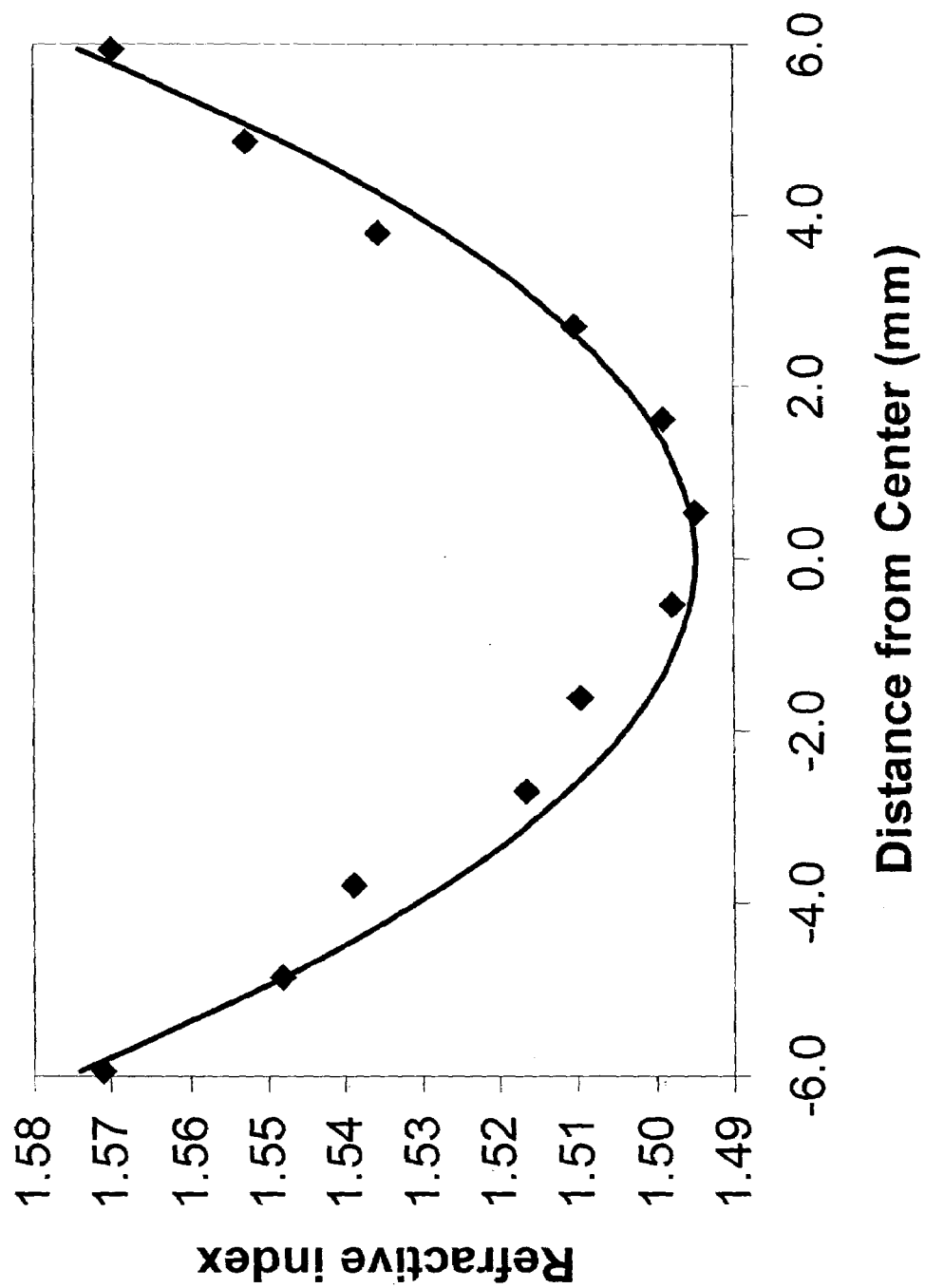
FIG. 14 shows a measured refractive index distribution of the diverging GRIN multilayer system compared to the design distribution.
Figure 15:
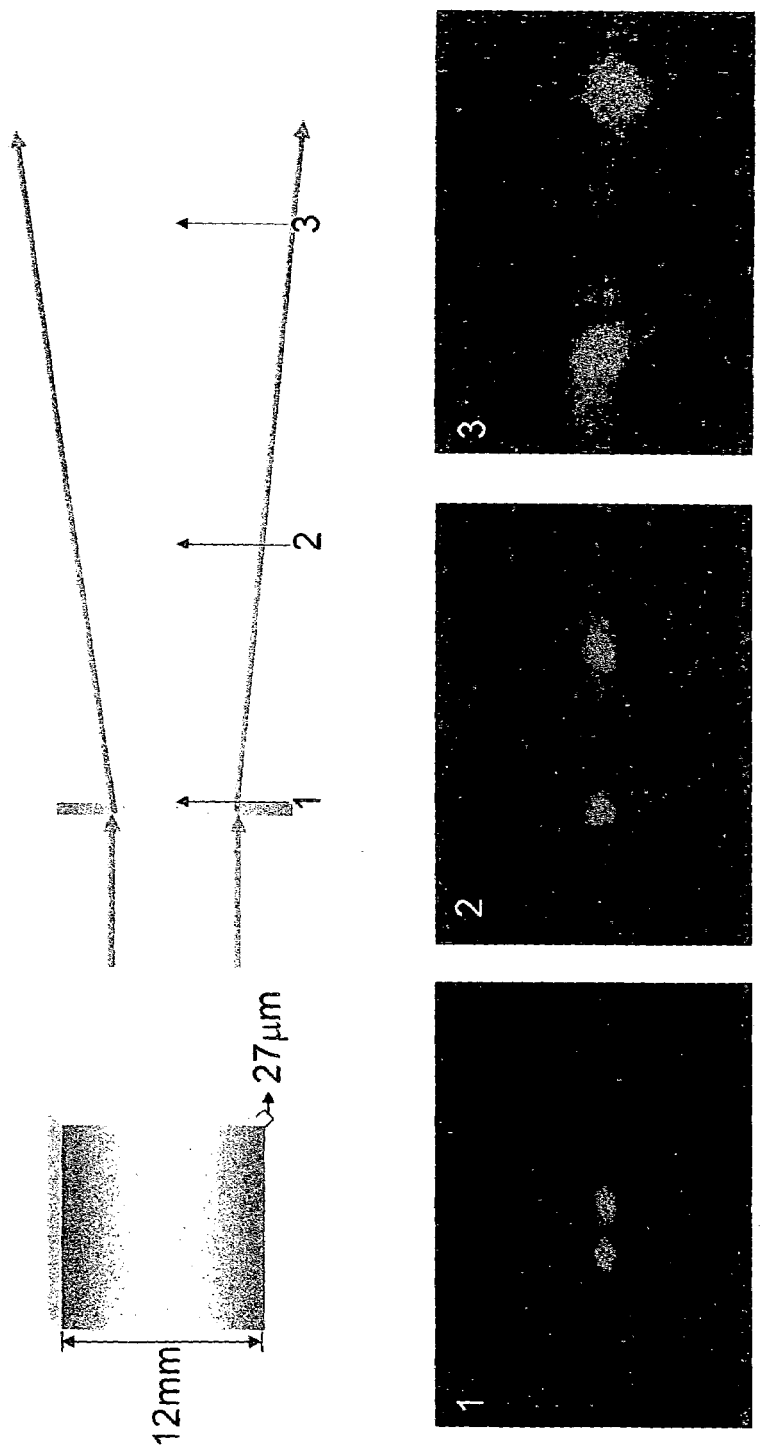
FIG. 15 represents observed focusing properties of the diverging GRIN multilayer system shown in FIG. 13.
Figure 16:
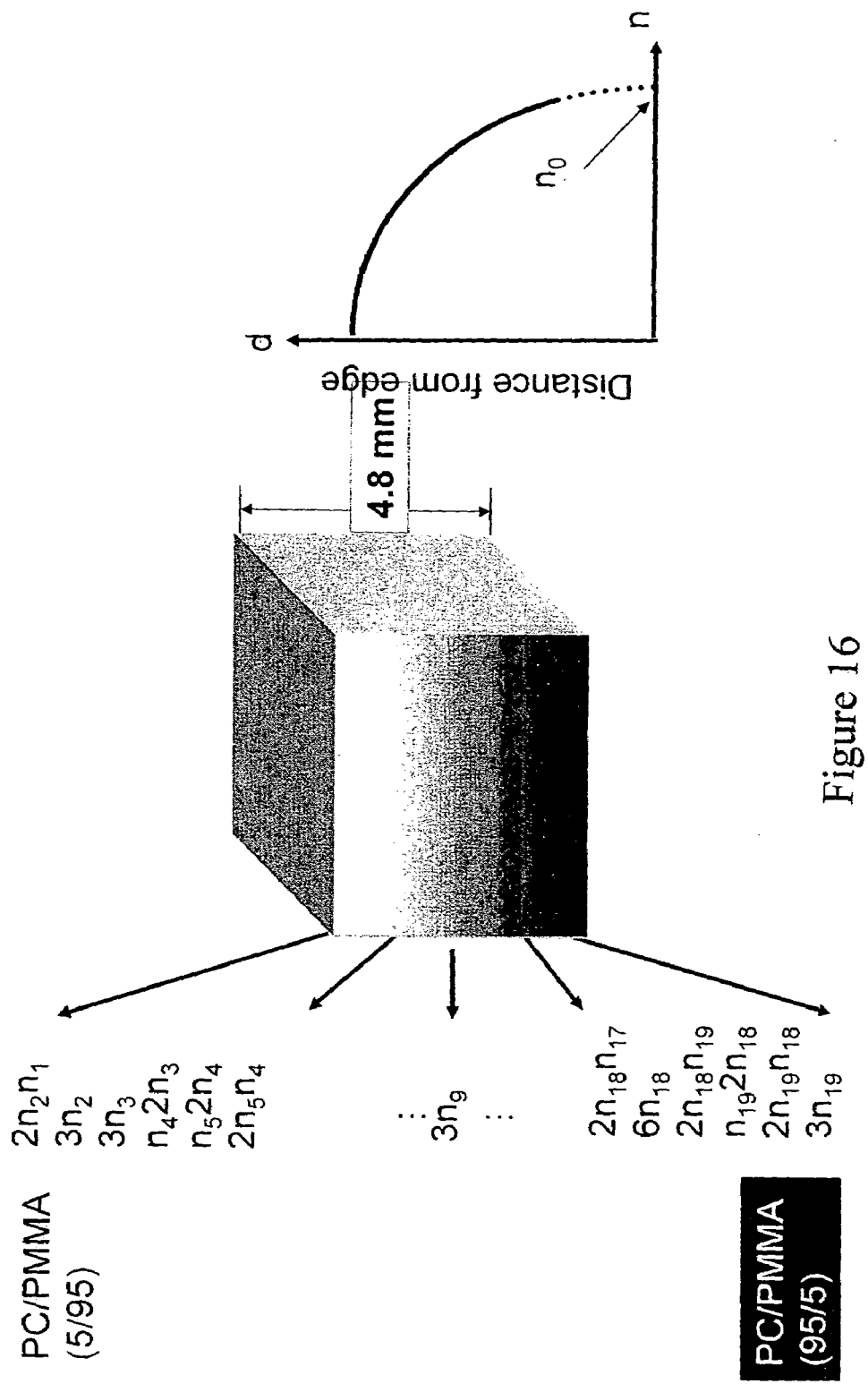
FIG. 16 shows a design of asymmetrical GRIN system from multilayer polymer composite films.

Several other hierarchical multilayered composite GRIN lenses with large index gradients have been fabricated. The design of one of these is shown in FIG. 13. FIG. 13 shows a hierarchical multilayered composite GRIN lens with an index that increases from the center to the edge. The measured index as a function of distance from the center of the polymer fabricated with this layer structure is shown in FIG. 14. It fits the equation:

$$n(d)=n_0(1+0.0015d^2)$$

where, in this case, $n_0=1.495$. A lens fabricated with this index distribution will have focusing properties like that of a conventional concave or defocusing cylindrical lens. The observed focusing properties are shown in FIG. 15. Experimentally, this demonstrates a hierarchical multilayered composite GRIN system that behaves as a defocusing cylindrical lens. Another hierarchical multilayered composite polymer index gradient that was fabricated is shown in FIG. 16.

Figure 17:
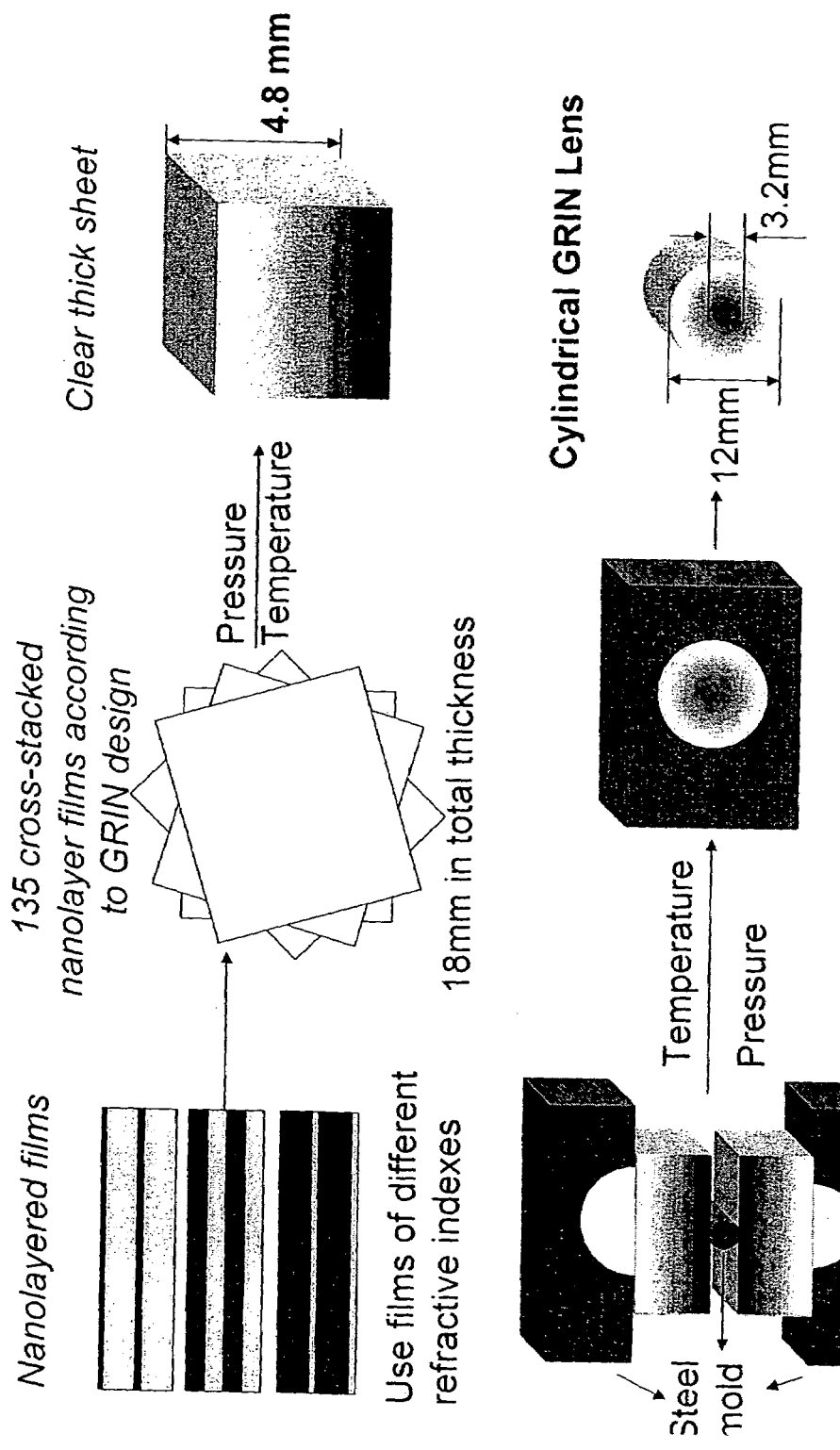
FIG. 17 shows a procedure for making a GRIN multilayer system with cylindrical symmetry.

This example has an unsymmetrical gradient. It is useful in the fabrication of a hierarchical multilayered composite GRIN lens with cylindrical symmetry. The fabrication of such a cylindrically symmetric hierarchical multilayered composite polymer is shown in FIG. 17. The index gradient can be fabricated so that it either increases or decreases radially outward from the center to the edge. The corresponding hierarchical multilayered composite GRIN lenses can be made to have either focusing or defocusing properties as desired. A focusing lens with this design was fabricated and we demonstrated that it behaves as a conventional convex or focusing lens. The design shown, with a hole in the middle, can also function as a preform for a wave guide light pipe.

In summary, we have fabricated multilayered polymer composite films; the multilayered polymer composite films were stacked to form multilayered composite GRIN sheets; from the multilayered composite GRIN sheets three types of lenses were formed: axial, radial and spherical.

Obviously, numerous modifications and variations of the present invention are possible in light of the above teachings. It is therefore to be understood that within the scope of the appended claims, the invention may be practiced otherwise than as specifically described herein.

What is claimed is:

1. A gradient index lens comprised of a multilayered composite GRIN sheet;
   wherein said multilayered composite sheet is comprised of a plurality of at least two multilayered polymer composite films;
   wherein each of said multilayered polymer composite films is comprised of a plurality of at least two alternating layers (A) and (B) represented by formula $(AB)_x$, where $x=2^n$, and n is in the range of from 4 to 18;
   wherein layer (A) is comprised of component (a) and layer (B) is comprised of component (b); and
   wherein said components (a) and (b) exhibit a different refractive index.

2. The lens of claim 1, wherein said components (a) and (b) are selected from the group consisting of a polymeric material, a composite polymer and a polymer blend.

3. The lens of claim 2, wherein said polymeric material is selected from the group consisting of a glassy material, a crystalline material and an elastomeric material.

4. The lens of claim 1, wherein said layers have a thickness of from 5 nm to 1,000 $\mu$m.

5. The lens of claim 1, wherein said multilayered composite polymer films are stacked in ordered layers to form a hierarchical multilayered composite GRIN sheet; and wherein adjacent multilayered composite polymer films are chosen to exhibit progressively different refractive indexes.

6. The lens of claim 1, wherein said multilayered composite polymer film comprises at least 10 alternating layers.

7. The lens of claim 1, wherein said multilayered composite polymer film comprises in the range of from 50 to 500,000 alternating layers.

8. The lens of claim 1, wherein said multilayered composite GRIN sheet is comprised of from 5 to 100,000 multilayered polymer composite films.

9. The lens of claim 1, wherein said multilayered composite GRIN sheet is comprised of from 20 to 10,000 multilayered polymer composite films.

10. The lens of claim 1, wherein components (a) and (b) are chemically the same materials.

11. The lens of claim 2, wherein said polymeric material is selected from the group consisting of a polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinylacetate, a polyether-amide, a styrene-acrylonitrile copolymer, a styrene-ethylene copolymer, poly(ethylene-1,4-cyclohexylenedimethylene terephthalate), an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, and urethane rubber.

12. The lens of claim 2 wherein said polymeric material is selected from the group consisting of a block and a graft copolymer.

13. The lens of claim 1, wherein said layers further comprise an organic or inorganic material designed to affect the refractive index.

14. The lens of claim 1, exhibiting an index gradient of 0.01 or higher.

15. The lens of claim 1, exhibiting an index gradient in the range of from 0.02 to 1.0.

16. The lens of claim 1, exhibiting an index gradient in the range of from 0.05 to 0.5.

17. The lens of claim 1, wherein said components (a) and (b) are miscible, immiscible or partially miscible polymeric materials.

18. The lens of claim 1, wherein said lens is selected from the group consisting of an axial, a radial and a spherical GRIN lens.

19. A method of fabricating the lens of claim 1, comprising fabricating the multilayered composite GRIN sheet by forming a set of multilayered polymer composite films comprised of alternating layers (A) and (B); assembling said films into a multilayered composite GRIN sheet; and forming the gradient index lens by slicing and shaping the multilayered composite GRIN sheets.

20. The method of claim 19, wherein said multilayered composite GRIN sheet exhibits an internal transmission greater than 20%.

21. The method of claim 19, wherein said multilayered composite GRIN sheet exhibits an internal transmission greater than 50%.

22. The method of claim 19, wherein the refractive index of said multilayered composite GRIN sheet is varied mechanically by pressure, tension, compression, shear or a combination of these stresses.

23. The method of claim 19, wherein said multilayered composite GRIN sheet comprises from 5 to 100,000 multilayered polymer composite films.

24. The method of claim 19, wherein said multilayered composite GRIN sheet comprises 20 to 10,000 multilayered polymer composite films.

25. The method of claim 19, wherein said multilayered composite GRIN sheet has an overall thickness ranging from 10 nm to 10 cm.

26. The method of claim 19, wherein said multilayered composite GRIN sheet has an overall thickness ranging from 25 mm to 3 cm.

27. The method of claim 19, wherein said multilayered composite GRIN sheet is formed into an axial, a radial or a spherical lens.

28. The method of claim 19, wherein said multilayered polymer composite films exhibit different refractive indexes.

29. The method of claim 28, wherein said differences in refractive indexes is accomplished by altering the relative thickness of layers (A) and (B).

30. The method of claim 1, wherein said multilayered polymer composite film or multilayered composite GRIN sheet is oriented.

31. A gradient index lens comprised of a multilayered composite structure; wherein said multilayered composite structure is comprised of a plurality of at least two multilayered polymer composite films;

wherein each of said multilayered polymer composite films is comprised of a plurality of at least three alternating layers (A), (B) and (C) represented by formula $(ABC)_x$, where $x=2^n$, and n is in the range of from 4 to 18;

wherein layer (A) is comprised of component (a), layer (B) is comprised of component (b), and layer (C) is comprised of component (c); and wherein said components (a), (b) and (c) exhibit a different refractive index.

* * * * *